United States Patent
Wu et al.

(10) Patent No.: US 12,050,284 B2
(45) Date of Patent: Jul. 30, 2024

(54) AUTOMOTIVE RADAR WITH HARDWARE ACCELERATED TARGET DETECTION CAPABILITY

(71) Applicant: NXP B.V., Eindhoven (NL)

(72) Inventors: Ryan Haoyun Wu, San Jose, CA (US); Satish Ravindran, Santa Clara, CA (US); Maik Brett, Taufkirchen (DE)

(73) Assignee: NXP B.V., Eindhoven (NL)

( * ) Notice: Subject to any disclaimer, the term of this patent is extended or adjusted under 35 U.S.C. 154(b) by 145 days.

(21) Appl. No.: 17/711,438

(22) Filed: Apr. 1, 2022

(65) Prior Publication Data

US 2023/0314560 A1 Oct. 5, 2023

(51) Int. Cl.
| G01S 7/295 | (2006.01) |
| G01S 7/288 | (2006.01) |
| G06F 9/38  | (2018.01) |
| G06F 9/54  | (2006.01) |

(52) U.S. Cl.
CPC .......... G01S 7/2955 (2013.01); G01S 7/2883 (2021.05); G06F 9/3877 (2013.01); G06F 9/545 (2013.01)

(58) Field of Classification Search
None
See application file for complete search history.

(56) References Cited

U.S. PATENT DOCUMENTS

| 5,499,030 A | 3/1996 | Wicks et al. |
| 5,808,579 A | 9/1998 | Rademacher |
| 2022/0120855 A1* | 4/2022 | Rosu ........................ G01S 13/34 |

OTHER PUBLICATIONS

Fatih Nar et al., RmSAT-CFAR: Fast and Accurate Target Detection in Radar Images, SoftwareX, vol. 8, Jul.-Dec. 2018, pp. 39-42, ISSN 2352-7110, https://doi.org/10.1016/j.softx.2017.09.005. (https://www.sciencedirect.com/science/article/pii/S235271101730047X).

Jeong Hun Kim et al., A Computationally Efficient CFAR Algorithm Based on a Goodness-of-Fit Test for Piecewise Homogeneous Environments, IEEE Transactions on Aerospace and Electronic Systems, vol. 49, No. Jul. 3, 2013.

Jiafei Zhao et al., Robust CFAR Detection for Multiple Targets in K-Distributed Sea Clutter Based on Machine Learning, MDPI, Received: Nov. 19, 2019; Accepted: Dec. 2, 2019; Published: Dec. 5, 2019.

Takahashi, Satoshi, "A CFAR Circuit with Multiple Detection Cells for Automotive UWB Radars", IEICE Transaction on Communication, Communications Society, Jun. 1, 2010, pp. 1574-1582, vol. E93B, No. 6, The Institute of Electronics, Information and Communication Engineers, Tokyo, JP.

Xu, Chuanwen et al., "Two-level CFAR Algorithm for Target Detection in MmWave Radar", 2021 International Conference on Computer Engineering and Application, Jun. 1, 2021, pp. 240-243, IEEE, Piscataway, NJ, USA.

* cited by examiner

Primary Examiner — Whitney Moore

(57) ABSTRACT

A vehicle radar system, apparatus and method use a radar control processing unit to generate a target response signal in at least a first dimension from compressed radar data signals and to perform cell-averaging constant false alarm rate (CA-CFAR) target detection by convolving the target response signal with a weighted kernel window signal in a frequency domain using a Fast Fourier Transform hardware accelerator, an element-wise multiplier, and an Inverse Fast Fourier Transform hardware accelerator to generate an output signal having a sign that indicates a target detection decision.

21 Claims, 9 Drawing Sheets

AUTOMOTIVE RADAR WITH HARDWARE ACCELERATED TARGET DETECTION CAPABILITY

BACKGROUND OF THE INVENTION

Field of the Invention

The present invention is directed in general to radar systems and associated methods of operation. In one aspect, the present invention relates to an automotive radar system which uses a cell-averaging constant false alarm rate receiver and associated methods of operation.

Description of the Related Art

To improve the safety of vehicle and passengers, Advanced Driver Assistance Systems (ADAS) use radar-based detection to provide reliable and accurate details of a vehicle's surroundings and to assist drivers to sense the on-road potential hazards in case of blocked vision or poor visibility conditions. ADAS radars operate by transmitting or radiating signals from transmitting antennas installed on a vehicle so that, when the transmitted radar signal hits a target and is reflected back to the vehicle, the target return signal is received by a radar front-end (FE) unit and processed by a radar controller processing unit which may apply a Constant False Alarm Rate (CFAR) detection algorithm to detect target returns against a background of noise, clutter and interference. However, existing CFAR receiver processing solutions are extremely difficult at a practical level by virtue of the balancing performance, complexity, and computational requirements when quickly, accurately, and efficiently identifying one or more radar targets with radar system applications.

BRIEF DESCRIPTION OF THE DRAWINGS

The present invention may be understood, and its numerous objects, features and advantages obtained, when the following detailed description of a preferred embodiment is considered in conjunction with the following drawings.

DETAILED DESCRIPTION

Figure 1:
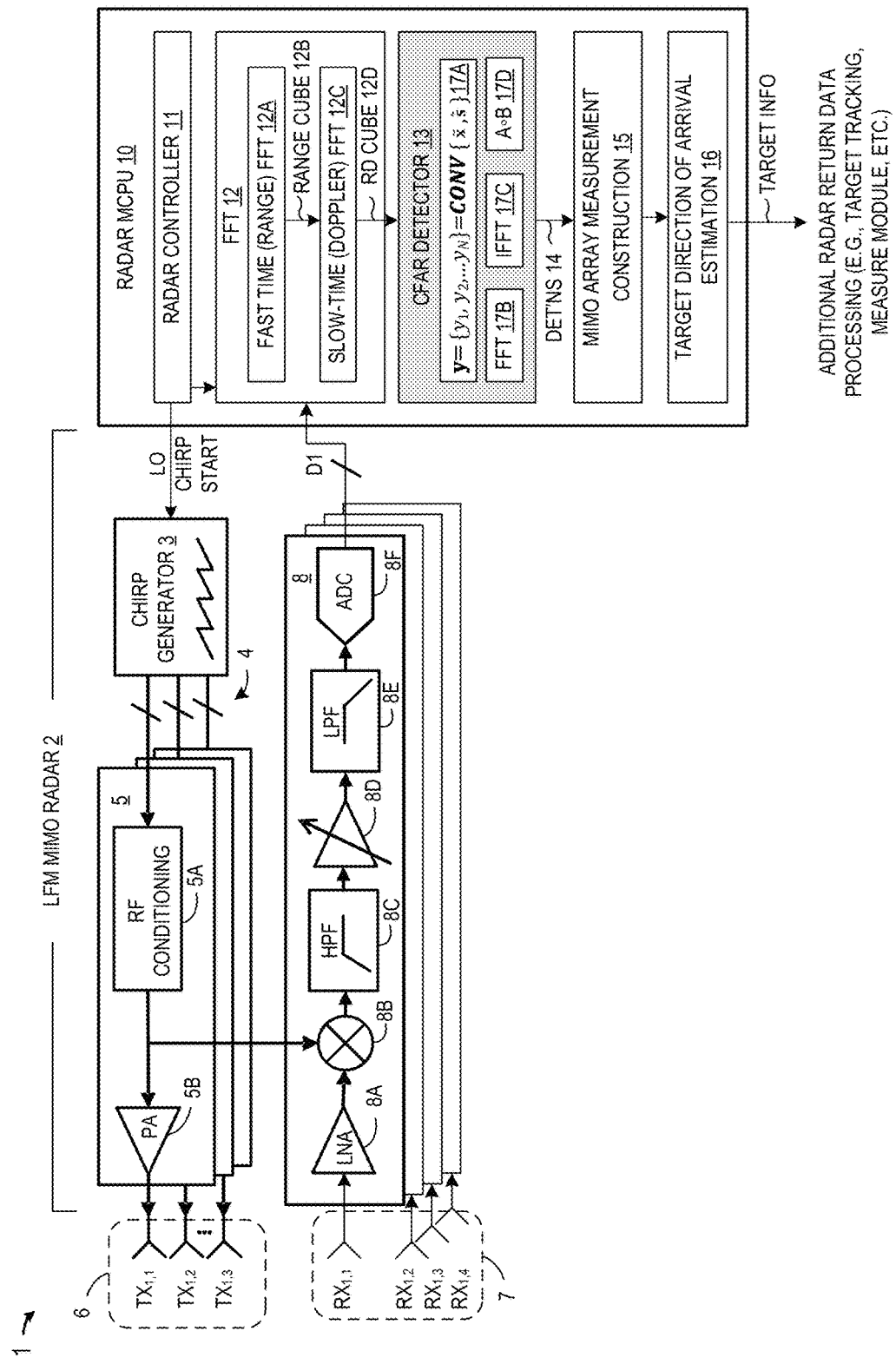
FIG. 1 is a simplified schematic block diagram of an LFM MIMO automotive radar system in accordance with selected embodiments of the present disclosure.

A radar system, apparatus, and methodology are described for detecting one or more targets with a cell average-constant false alarm rate detector which uses a sliding cell-averaging window that can be arbitrarily shaped and weighted to adapt to various use cases. To this end, the CA-CFAR sliding window operation is converted to a spectral domain convolution process in which the target (range, Doppler, angle) response is convolved with a modified kernel window so that the sign of the output indicates the detection decision. In particular, the weighted sum operation of the CA-CFAR sliding window is characterized with the time-domain convolution term $y=\text{CONV}\{\tilde{x}, \overset{\leftarrow}{s}{}^*\}$, where $\tilde{x}$ is the head and tail padded target response (x) and where $\overset{\leftarrow}{s}{}^*$ is the convolution kernel window constructed from the complex conjugate value of the order-reversed window weight vector (s). And by using the convolution theorem (whereby convolution in the time domain equals multiplication in the spectral domain), the time-domain convolution term $y=\text{CONV}\{\tilde{x}, \overset{\leftarrow}{s}{}^*\}$ may be solved in the spectral domain by zero-padding the complex conjugated order-reversed window weight vector $\overset{\leftarrow}{s}{}^*$ to the same length of the padded target response $\tilde{x}$, and then computing the discrete spectrums, $\tilde{X}=\text{FFT}\{\tilde{x}\}$ and $\tilde{S}=\text{FFT}\{\overset{\leftarrow}{s}{}^*$ with zero padding$\}$ before computing the element-wise multiplication product of the spectrums $\tilde{Y}=\tilde{X}\tilde{S}$ and then applying an inverse fast Fourier transform to convert the spectral product back to the time domain to obtain the padded detection decision metric output vector $\tilde{y}=\text{IFFT}\{\tilde{Y}\}$ which contains the final detection decision metric output vector y which is padded with head and tail paddings. By using a hardware-accelerated Fast Fourier Transform and Inverse Fast Fourier Transform engine to implement the 1D/2D/3D convolution in the frequency domain, improved computational efficiency is achieved.

By way of background to the present disclosure, constant false alarm rate circuits function to determine the power threshold above which any target return signal can be considered to probably originate from a target. If this threshold is too low, then more targets will be detected at the expense of increased numbers of false alarms, resulting in a high false alarm rate. Conversely, if the threshold is too high, the false alarm rate will be low, but fewer targets will be detected. In most radar detectors, the threshold is set in order to achieve a required probability of false alarm (or equivalently, false alarm rate or time between false alarms). If the background noise against which targets are to be detected is stationary with time and space, then a fixed threshold level can be chosen that provides a specified probability of false alarm. However, in most fielded systems, unwanted clutter and interference sources mean that the noise level changes both spatially and temporally. In such cases, a changing threshold can be used so that the threshold level is raised and lowered to maintain a constant probability of false alarm. This is known as constant false alarm rate (CFAR) detection. In most CFAR detection schemes, the threshold level is calculated by estimating the level of the noise floor around the cell under test (CUT). This can be found by taking a block of cells around the CUT and calculating the average power level, typically by ignoring the "guard cells" immediately adjacent to the CUT to avoid corrupting this estimate with power from the CUT itself. Once the threshold level is calculated as the local average power level, a target is detected at the CUT if it is both greater than all its adjacent cells and greater than the threshold level. This simple approach is called a cell-averaging CFAR (CA-CFAR). Due to its sliding window vector element-wise product operation and associated computational power requirements, the window length as well as the number of cells that can be detected are often limited. And because the design of the CA-CFAR window is done heuristically, optimal performance is difficult to obtain, if it is even possible.

By way of additional background information to the present disclosure, reference is now made to FIG. 1 which depicts a simplified schematic block diagram of a Linear Frequency Modulation (LFM) multiple-input, multiple output (MIMO) automotive radar system 1 which includes an LFM MIMO radar device 2 connected to a radar microcontroller processing unit (MCPU) 10. In selected embodiments, the LFM MIMO radar device 2 may be embodied as a line-replaceable unit (LRU) or modular component that is designed to be replaced quickly at an operating location. Similarly, the radar MCPU 10 may be embodied as a line-replaceable unit (LRU) or modular component. Although a single or mono-static LFM MIMO radar device 20 is shown, it will be appreciated that additional distributed radar devices may be used to form a distributed or multistatic radar. In addition, the depicted radar system 1 may be implemented in integrated circuit form with the LFM MIMO radar device 2 and the radar MCPU 10 formed with separate integrated circuits (chips) or with a single chip, depending on the application.

Each radar device 2 includes one or more transmitting antenna elements $TX_i$ and receiving antenna elements $RX_j$ connected, respectively, to one or more radio-frequency (RF) transmitter (TX) units 5 and receiver (RX) units 8. For example, each radar device 2 is shown as including individual antenna elements (e.g., $TX_{1,i}$, $RX_{1,j}$) connected, respectively, to three transmitter modules (e.g., 5) and four receiver modules (e.g., 8), but these numbers are not limiting and other numbers are also possible, such as four transmitter modules 5 and six receiver modules 8, or a single transmitter module 5 and/or a single receiver module 8. Each radar device 2 also includes a chirp generator 3 which is configured and connected to supply a chirp input signal to the transmitter module(s) 5. To this end, the chirp generator 3 is connected to receive a separate and independent local oscillator (LO) signal and a chirp start trigger signal from the radar MCPU 10. Chirp signals are generated and transmitted to multiple transmitters 5, usually following a pre-defined transmission schedule, where they are filtered at the RF conditioning module 5A and amplified at the power amplifier 5B before being fed to the corresponding transmit antenna $TX_{1,j}$ and radiated. By sequentially using each transmit antenna $TX_{1,i}$ to transmit successive pulses in the chirp signal, each transmitter element 5 operates in a time-multiplexed fashion in relation to other transmitter elements because they are programmed to transmit identical waveforms on a temporally separated schedule.

The radar system 1 also includes a radar MCPU 10 that is connected to supply input control signals to the radar device 2 and to receive therefrom digital output signals D1 generated by the receiver modules 24. In selected embodiments, the radar MCPU 10 may be configured and arranged for signal processing tasks such as, but not limited to, target identification, computation of target distance, target velocity, and target direction, and generating control signals. The radar MCPU 10 may, for example, be configured to generate calibration signals, receive data signals, receive sensor signals, generate frequency spectrum shaping signals (such as ramp generation in the case of FMCW radar) and/or register programming or state machine signals for RF (radio frequency) circuit enablement sequences. In addition, the radar MCPU 10 may be configured to program the transmitter modules 5 to operate in a time-division fashion by sequentially transmitting LFM chirps for coordinated communication between the transmit antennas $TX_{1,i}$, $RX_{1,j}$.

In the example shown, each chirp generator 3 generates a chirp signal 4 in response to a chirp start trigger signal and a corresponding reference local oscillator signal (Reference LO). The resulting chirp signal 4 from each chirp generator 3 is then processed by the RF conditioning unit 5A and amplified at the power amplifier (PA) 5B which amplifies the signal to a level suitable for transmission as a radar signal by a transmitter antenna unit $TX_{1,1}$ 6. Though not shown, it will be understood that the transmitter module 5 may include additional processing circuits, such as a digital-to-analog converter (DAC), phase shifter (or phase rotator), buffer, mixer, filter, and the like.

The radar signal transmitted by the transmitter antenna unit $TX_{1,1}$ 6 may be reflected by an object, and part of the reflected radar signal reaches the receiver antenna units $RX_{1,i}$ 7 at the radar device 2. At each receiver module 8, the received (radio frequency) antenna signal is amplified by a low noise amplifier (LNA) 8A and then fed to a mixer 8B where it is mixed with the transmitted chirp signal generated by the RF conditioning unit 5A. The resulting intermediate frequency signal is fed to a first high-pass filter (HPF) 8C. The resulting filtered signal is fed to a first variable gain amplifier 8D which amplifies the signal before feeding it to a first low pass filter (LPF) 8E. This re-filtered signal is fed to an analog/digital converter (ADC) 8F and is output by each receiver module 8 as a digital signal D1.

At the radar MCPU 10, the digital signal D1 is processed by the radar modules 12-16 to detect and measure target returns by extracting target range, Doppler (radial velocity), angle, and amplitude information. For example, the digital output signals D1 may be processed by one or more fast Fourier transform (FFT) modules 12, such as a fast-time (range) FFT module 12A and slow-time (Doppler) FFT module 12C. The fast-time (range) FFT module 12A converts the sampled deramp mixed signal in fast-time dimension into target range spectrum cube 12B, and the slow-time (Doppler) FFT module 12C converts range cell output 12B over slow-time dimension into a Doppler or radial velocity, thereby generating a three-dimensional (3D) range-Doppler channel cube 12D. In turn, the 3D range-Doppler channel cube outputs are then passed through one or more constant false alarm rate (CFAR) detector modules 13 to obtain the range-Doppler peak detections 14 which are processed by the MIMO array measurement construction module 15 to construct MIMO arrays for use by the target direction of arrival estimation module 16 to estimate the direction of arrival for the target return(s). For purposes of understanding the operation of the conventional CFAR detector 13, the processing modules 17A-D are not discussed, but will be addressed in connection with the description of the present invention provided hereinbelow. In addition, there are one or more additional radar return data processing steps that may be performed, such as target tracking processing and measurement processing, with the result being output to other automotive computing or user interfacing devices for further process or display.

Figure 2:
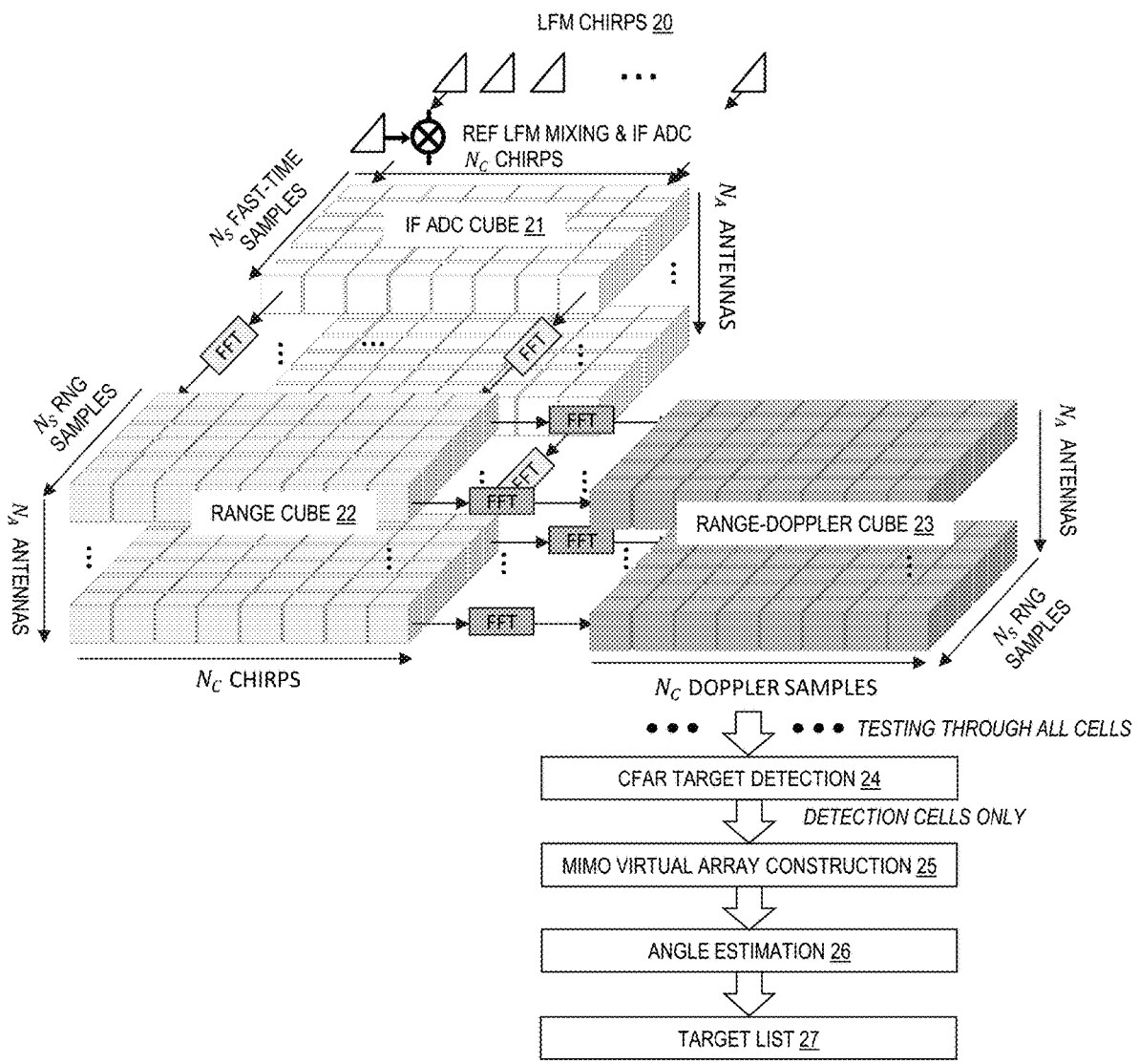
FIG. 2 shows a receiver signal processing chain diagram of an LFM automotive MIMO radar system.

To provide additional details for an improved contextual understanding of the present disclosure, reference is now made to FIG. 2 which shows a receiver signal processing chain diagram 2 of an LFM automotive MIMO radar system, such as depicted in FIG. 1. As illustrated, a series of N LFM chirps 20 are transmitted, and the resulting target return signals are received and sampled to create intermediate frequency (IF) ADC cubes 21 of $N_s$ fast-time samples for NA respective antennas. The IF ADC cube samples 21 are transformed with a first fast-time (range) FFT to provide range response cubes 22, which can then be transformed with a second slow-time (Doppler) FFT to provide range-Doppler response cubes 23 which can be output and used for CFAR target detection processing 24 which outputs only the target detection cells for processing by the MIMO virtual array construction module 25 and angle estimation processing module 26 to generate a target list 27.

Figure 3A:
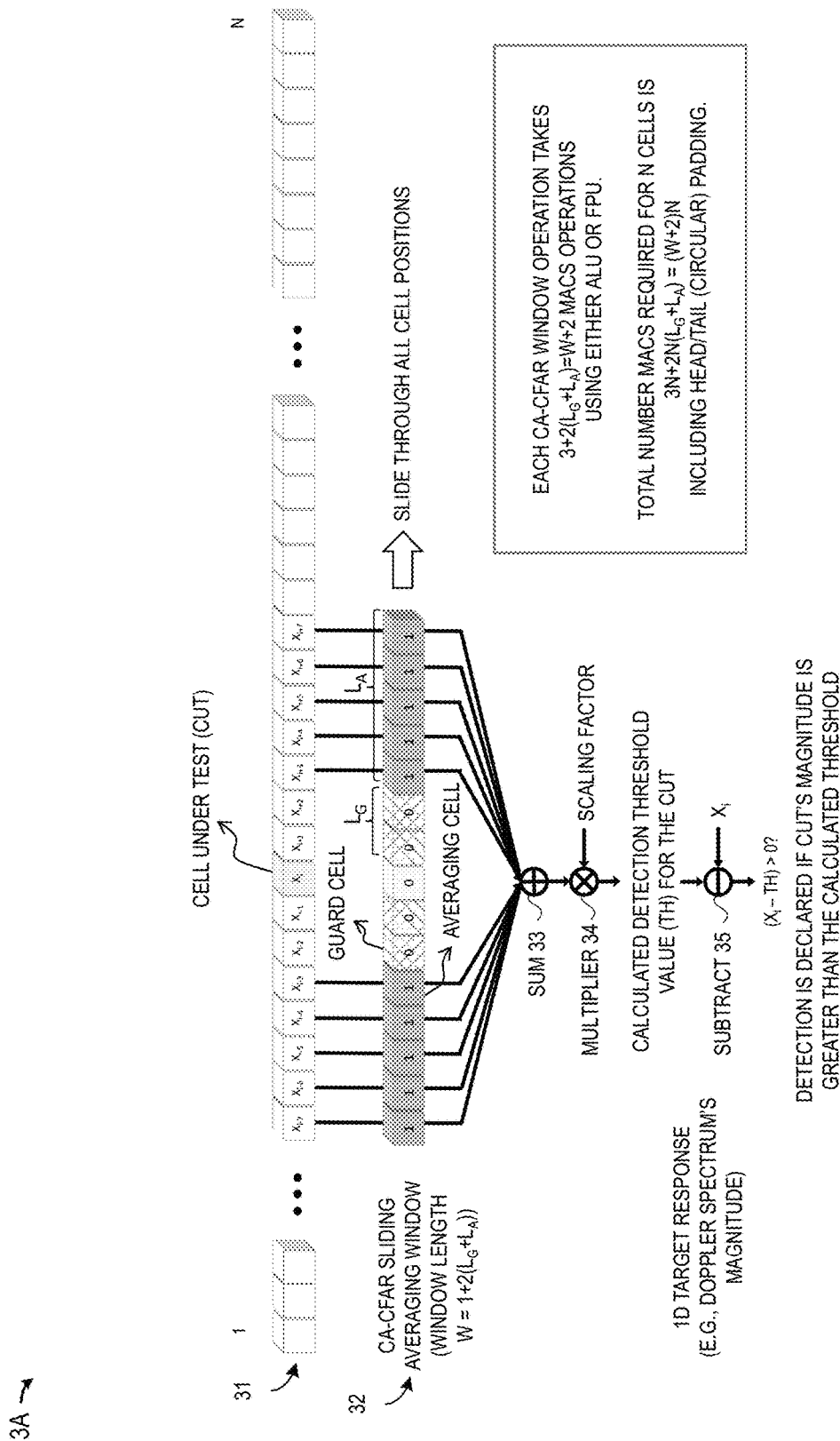
FIG. 3A is a simplified block diagram of a one-dimensional cell-averaging constant false alarm rate (CA-CFAR) sliding averaging window for processing 1D target responses.
Figure 3B:
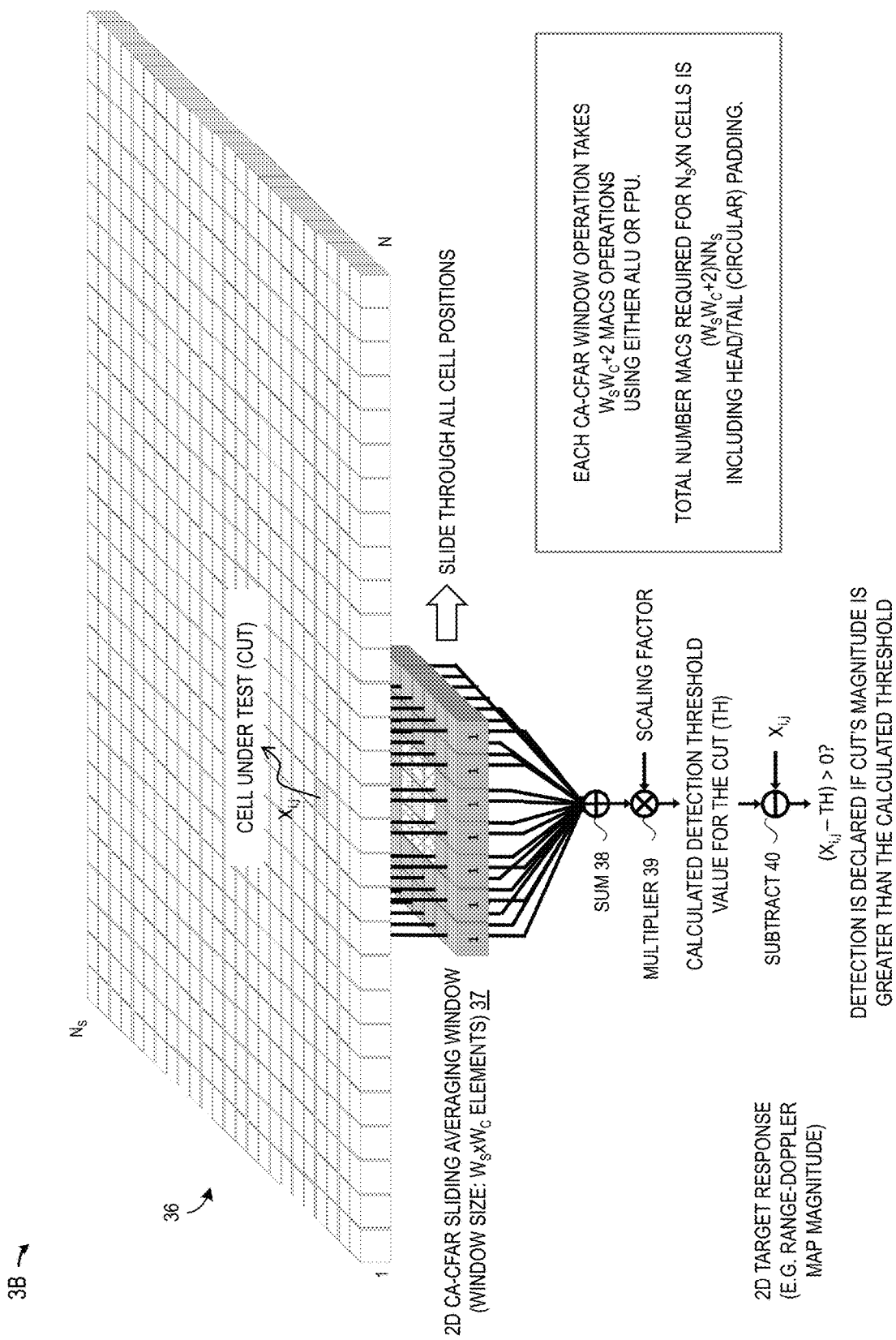
FIG. 3B is a simplified block diagram of a two-dimensional CA-CFAR sliding averaging window for processing 2D target responses.

Since the present disclosure is directed to improving the computational efficiency and performance of the CFAR target detection processing 24 of the process, reference is now made to FIGS. 3A and 3B which illustrate, respectively, a one-dimensional CA-CFAR operation (FIG. 3A) and a two-dimensional CA-CFAR operation (FIG. 3B), though it will be appreciated that the operative principles disclosed herein can be extended to higher dimensions in a straightforward manner. Turning first to FIG. 3A, there is depicted a simplified block diagram 3A of a one-dimensional CA-CFAR sliding averaging window 32 for processing 1D target responses 31. As depicted, the input 1D target responses 31 include N input cells, and which can be either range, Doppler, or angle cells. In addition, the CA-CFAR sliding averaging window 32 is shown as having a defined window length that slides through all of the cell positions of the input 1D target responses 31. The window length $W=1+2(L_G+L_A)$ is defined in terms of a guard cell count $L_G$ and an averaging cell count $L_A$ on each side of a single cell under test (CUT). In particular, for a given CUT (e.g., $x_i$), a defined number of $L_G$ immediately adjacent guard cells to the left and right (e.g., $x_{i-2}$, $x_{i-1}$, $x_{i+1}$, $x_{i+2}$) are omitted or neglected from the CA-CFAR processing. Beyond the guard cells, a defined number of $L_A$ averaging cells are used for averaging in the CA-CFAR processing.

By applying the 1D CA-CFAR sliding averaging window 32 as a multiplying window, the magnitudes of the averaging cells are averaged and scaled based on a detection threshold margin (e.g. 3 dB which is equivalent to doubling the averaged magnitude). To this end, the CA-CFAR sliding averaging window 32 may constructed with multiplier values of "1" in the $L_A$ averaging cell positions and with multiplier of values of "0" in the $L_G$ guard cell positions. Thus constructed, the resulting product of the CA-CFAR sliding averaging window 32 and the corresponding cells from the input 1D target response 31 (e.g., $x_{i-7}$-$x_{i+7}$) can be combined at the summing circuit 33, where the resulting output value is the combination of "window-filtered" target response averaging cells (e.g., $x_{i-7}$-$x_{i-3}$, $x_{i+3}$, $x_{i+7}$) but not the target response guard cells (e.g., $x_{i-2}$-$x_{i+2}$). The output value is then multiplied with a scaling factor at the multiplier circuit 34 to calculate a detection threshold value (TH) for the CUT. At the subtraction circuit 35, the detection threshold value (TH) is subtracted from the target response value for the CUT (e.g., $x_i$), and a target is declared if the CUT's magnitude is greater than the detection threshold value (TH). As seen from the foregoing, each CA-CFAR window operation takes $3+2(L_G+L_A)=W+2$ MACS operations using either ALU or FPU operations, where W is the window length and $W=1+2(L_G+L_A)$. As a result, the number of real-valued Multiplication and Sum operations (MACS) required to compute the detection threshold values (TH) for a vector of N magnitude samples or cells (including threshold checking) will be N(W+2), including head/tail (circular) padding.

Referring now to FIG. 3B, there is depicted a simplified block diagram 3B of a two-dimensional CA-CFAR sliding averaging window 37 for processing 2D target responses 36. As depicted, the input 2D target responses 36 include $N \times N_S$ input cells which are generated from the N LFM chirps and $N_S$ samples, such as a range-Doppler map. In addition, the CA-CFAR sliding averaging window 37 is shown as having a defined window size (e.g., $W_S \times W_C$) that slides through all of the cell positions of the input 2D target responses 36. Each dimension $W_S$, $W_C$ of the CA-CFAR sliding averaging window 37 has a length $W=1+2(L_G+L_A)$ that is defined in terms of a guard cell count $L_G$ and an averaging cell count $L_A$ on each side of a single cell under test (CUT). In particular, for a given CUT (e.g., $x_{i,j}$), the 2D CA-CFAR sliding averaging window 37 may include, in each dimension, a defined number of $L_G$ immediately adjacent guard cells constructed with multiplier values of "0" and a defined number of adjacent $L_A$ averaging cells constructed with multiplier values of "1" that are used for averaging in the CA-CFAR processing. Thus constructed, the resulting product of the 2D CA-CFAR sliding averaging window 37 and the corresponding cells from the input 2D target response 36 can be combined at the summing circuit 38, where the resulting output value is the combination of "window-filtered" target response averaging cells, but not the target response guard cells. The output "average" value is then multiplied with a scaling factor at the multiplier circuit 39 to calculate a detection threshold value (TH) for the CUT which is subtracted at the subtraction circuit 35 from the target response value for the CUT (e.g., $x_{i,j}$), and a target is declared if the CUT's magnitude is greater than the detection threshold value (TH). As seen from the foregoing, each CA-CFAR window operation takes $W_S W_C + 2$ MACS operations using either ALU or FPU operations, where $W_S$ corresponds to the number of cells of the window in the range dimension and $W_C$ corresponds to the number of cells of the window in the Doppler dimension. As a result, the number of real-valued Multiplication and Sum operations (MACS) required to compute the detection threshold values (TH) for an array of $N \times N_S$ magnitude samples or cells (including threshold checking) will be $N_S N(W_S W_C + 2)$, including head/tail (circular) padding.

As seen from these examples, conventional CA-CFAR operations will consume a lot of compute resources when the number of cells is large or the window size is large. As a result, the CA-CFAR detectors typically used in automotive radar limits will have limited widow sizes that can adversely affect the target detection performance. Another challenge with conventional CA-CFAR detectors is that the size of window and the arrangement of the guard cells and average cells are designed heuristically. In addition, the CA-CFAR windows typically use simplistic zero/one window weights. This heuristic window pattern design approach and simplistic weighting often leads to sub-par performance which needs to be constantly tuned to achieve acceptable detection performance. The process is tedious and frustrating at times and optimal performance is difficult to obtain.

To address these deficiencies from conventional approaches and others known to those skilled in the art, there is disclosed herein a method and apparatus for using a modified spectral-domain convolution to efficiently implement CA-CFAR detection processing by leveraging the hardware-accelerated FFT ASIC/DSP engine common to most automotive radar processor chips. As explained more fully hereinbelow, the convolution-based CA-CFAR detection is achieved by rearranging the entire CA-CFAR detection process to convert it into a sliding-window weighted sum problem, which is then converted into a correlation problem, and then a convolution problem, and finally the convolution is implemented in the spectral domain using convolution theorem based on FFT and IFFT.

Figures 4A, 4B:
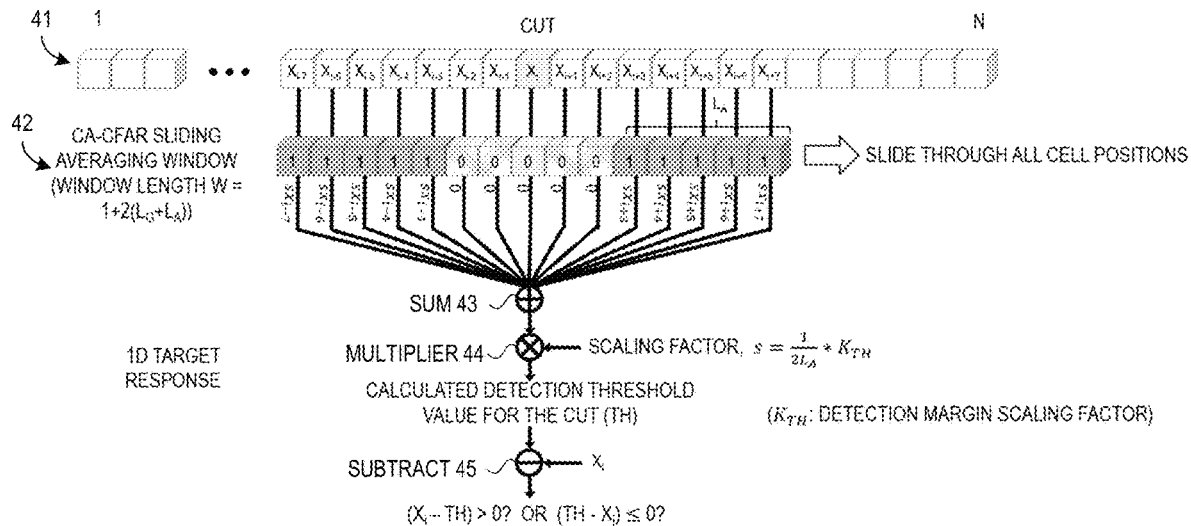
FIG. 4A is a simplified block diagram of a standard one-dimensional CA-CFAR sliding averaging window with averaging cells that are summed and scaled to generate a threshold for comparison to a cell under test when processing 1D target responses.
FIG. 4B is a simplified block diagram of a one-dimensional CA-CFAR sliding averaging window with averaging cells that are summed with an inverted cell under test value when processing 1D target responses.

To provide additional details for an improved contextual understanding of the present disclosure, reference is now made to FIG. 4A which shows a simplified block diagram 4A of a standard one-dimensional CA-CFAR sliding averaging window 42 with averaging cells that are summed and scaled to generate a threshold for comparison to a cell under test when processing 1D target responses. As depicted, the input 1D target responses 41 include N input cells which are generated from the N LFM chirps. In addition, the CA-CFAR sliding averaging window 42 is shown as having a defined window length $W = 1 + 2(L_G + L_A)$ that slides through all of the cell positions of the input 1D target responses 41, where the CA-CFAR sliding averaging window 42 includes $L_G$ guard cells on each side of a single cell under test (CUT) and $L_A$ averaging cells immediately adjacent to the $L_G$ guard cells. By applying the 1D CA-CFAR sliding averaging window 42 as a multiplying window, the magnitudes of the averaging cells are averaged and scaled to compute a using a summing circuit 43, multiplier circuit 44, and subtraction circuit 35 to compute a CFAR detection threshold value (TH) similar to the operation depicted in FIG. 3A. In operation, the CA-CFAR sliding averaging window 42 can be viewed as multiplying the windowed target magnitude response elements 41 with weights of zeros (on the guard cells and the CUT) and ones (on the averaging cell), and the product is summed (at the summing circuit 43) and then scaled (at the multiplier circuit 44) by multiplying the sum with the scaling factor s to compute the CFAR detection threshold value (TH). However, the purpose of the scaling factor s is to create averaging effect on the sum and then scale it up to include a detection margin. Since there are $2L_A$ averaging cells, the scaling factor s should include a factor of $1/(2L_A)$. In addition, the scaling factor s also includes a detection margin factor $K_{TH}$ which sets the threshold higher than the averaged output. As a result, the scaling factor $s = K_{TH}/(2L_A)$. At the subtraction circuit 35, the computed threshold (TH) is subtracted from the CUT's magnitude $x_i$. If the difference $(x_i - TH)$ is greater than zero, a detection is declared for the CUT.

In order to illustrate how the CFAR detection process shown in FIG. 4A is converted to a weighted sum operation, reference is now made to FIG. 4B which shows a simplified block diagram 4B of a one-dimensional CA-CFAR sliding averaging window 47 with averaging cells that are summed with an inverted cell under test value when processing 1D target responses. Again the depicted input 1D target responses 46 include N input cells which are generated from the N LFM chirps, and the CA-CFAR sliding averaging window 47 is shown as having a defined window length $W = 1 + 2(L_G + L_A)$ that slides through all of the cell positions of the input 1D target responses 46, where the CA-CFAR sliding averaging window 47 includes $L_G$ guard cells on each side of a single cell under test (CUT) and $L_A$ averaging cells immediately adjacent to the $L_G$ guard cells. However, instead of constructing the CA-CFAR sliding averaging window 47 with weights of zeros (on the guard cells and the CUT) and ones (on the averaging cell), the weights of the averaging cells in the CA-CFAR sliding averaging window 47 are constructed with the scaling factor s, and the weight of the CUT cell is constructed with a weight of "−1." Thus constructed with a window weight vector $s = [s_1, s_2, \ldots s_w] = [s, s, s, s, s, 0, 0, -1, 0, 0, s, s, s, s, s]$, the resulting product of the 1D CA-CFAR sliding averaging window 47 and the corresponding cells from the input 1D target response 46 are combined at the summing circuit 48, where the resulting output value is the final CA-CFAR detection check metric $(TH - X_i)$ which, if smaller than zero, is used to declare a target detection for the CUT. As a result, the CA-CFAR sliding averaging window 47 effectively converts the CA-CFAR detection process to a weighted sum operation with the summing circuit 48 which eliminates the final scaling factor and subtraction steps, and replaces them with changing the weights for the averaging cell from 1 to s and then the weight of the CUT from zero to −1.

Figure 5A:
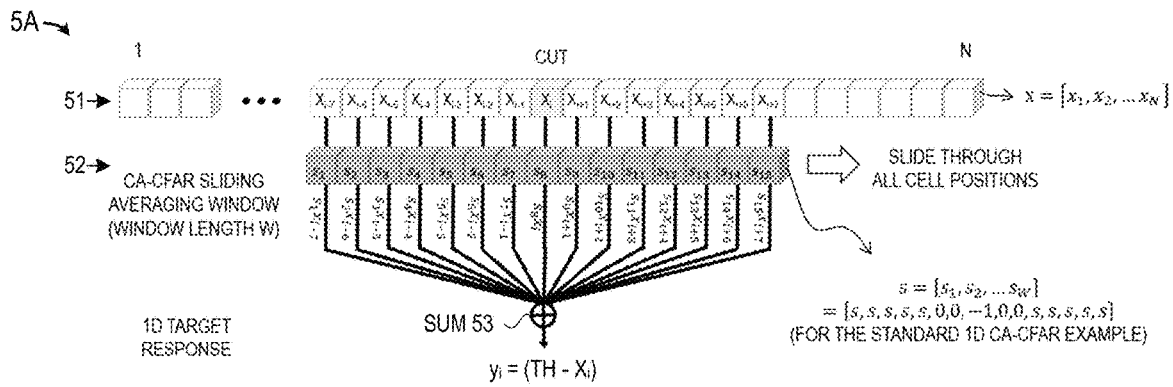
FIG. 5A is a simplified block diagram of a one-dimensional CA-CFAR sliding averaging window which uses a window weight vector (s) to implement a weighted sum operation on the cell under test $x_i$ and surrounding target responses when processing of 1D target responses.

In order to illustrate generic weighted sum implementation of the CFAR detection process, reference is now made to FIG. 5A which shows a simplified block diagram 5A of a one-dimensional CA-CFAR sliding averaging window 52 which uses a window weight vector (s) to implement a weighted sum operation on the cell under test $x_i$ and surrounding target responses when processing of 1D target responses 51. As depicted, the input 1D target responses 51 include N input cells which are generated from the N LFM chirps, and can be constructed as $x = [x_1, x_2, \ldots x_N]$. In addition, the CA-CFAR sliding averaging window 52 is shown as a window weight vectors that includes a plurality of weight values that can be constructed as $s = [s_1, s_2, \ldots s_w] = [s, s, s, s, 0, 0, -1, 0, 0, s, s, s, s, s]$. Using the CA-CFAR sliding averaging window 52, the weighted sum operation is sequentially applied to slide through the entire target response magnitude vector 51 element by element.

Figure 5B:
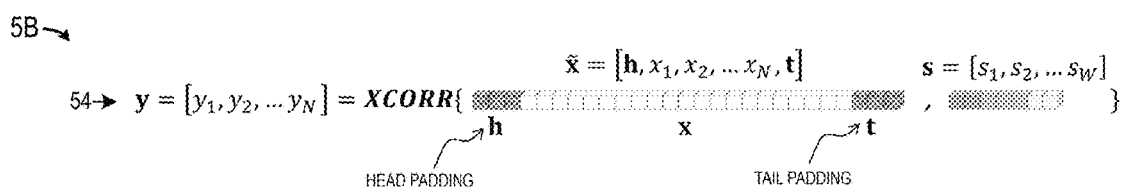
FIG. 5B is a simplified block diagram representation of the weighted sum operation shown in FIG. 5A with a cross correlation of a head and tail padded target response (x) and the window weight vector (s).

The foregoing slide operation of the 1D target responses 51 and CA-CFAR sliding averaging window 52 can be viewed as a cross-correlation (XCORR) of the target response (x) and the window weight vector (s). To illustrate this, reference is now made to FIG. 5B which is a simplified block diagram 5B representation of the weighted sum operation shown in FIG. 5A with a computed correlation term y 54 which is the cross correlation of a head and tail padded target response (x) and the window weight vector (s) to compute the correlation term y=XCORR{x̃, s}. In FIG. 5B, the XCORR operation is depicted in which an additional padded for the head portion (h) and the tail portion (t) (of the size of the window size minus 1 and divided by 2) are included to generate detection decision metric for every cell. The padding can be zeros, or by copying and pasting the other end's cell magnitudes (resulting in circular XCORR). Only full-length correlation output is reported (in which entire window is overlapped with the padded target response x̃).

Figure 5C:
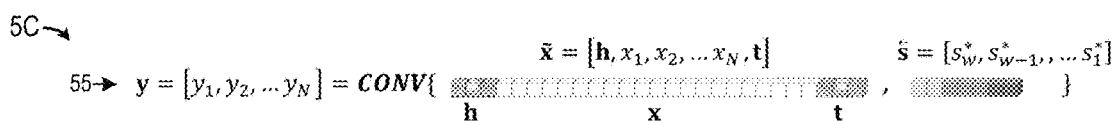
FIG. 5C is a simplified block diagram representation of the weighted sum operation shown in FIG. 5A with a time-domain convolution of a head and tail padded target response (x) and the window weight vector (s) after reversing the index order of the window weight vector and computing a complex conjugate value of the order-reversed window weight vector.

In the next step for converting a standard 1D CA-CFAR problem into a modified spectral domain convolution operation is to convert the correlation term y=XCORR{x̃, s} into a convolution problem. To illustrate this, reference is now made to FIG. 5C which is a simplified block diagram 5C representation of the weighted sum operation shown in FIG. 5A with a computed convolution term y 55 which is the convolution of the padded target response St and the vector ($\overset{\leftarrow}{s}$) to compute the convolution term y=CONV{x̃, $\overset{\leftarrow}{s}$}. In FIG. 5C, the padded target response x̃ is constructed as the target response (x) with additional padding for the head portion (h) and the tail portion (t) (of the size of the window size minus 1 and divided by 2) that are included to generate detection decision metric for every cell. In addition, the vector ($\overset{\leftarrow}{s}$) is computed by reversing the index order of the window (s) and then taking complex conjugate value of the order-reversed window weight vector, or $\overset{\leftarrow}{s}=[s_w^*, s_{w-1}^*, \ldots s_1^*]$. For real-value operations, the complex conjugating can be neglected.

Figure 5D:
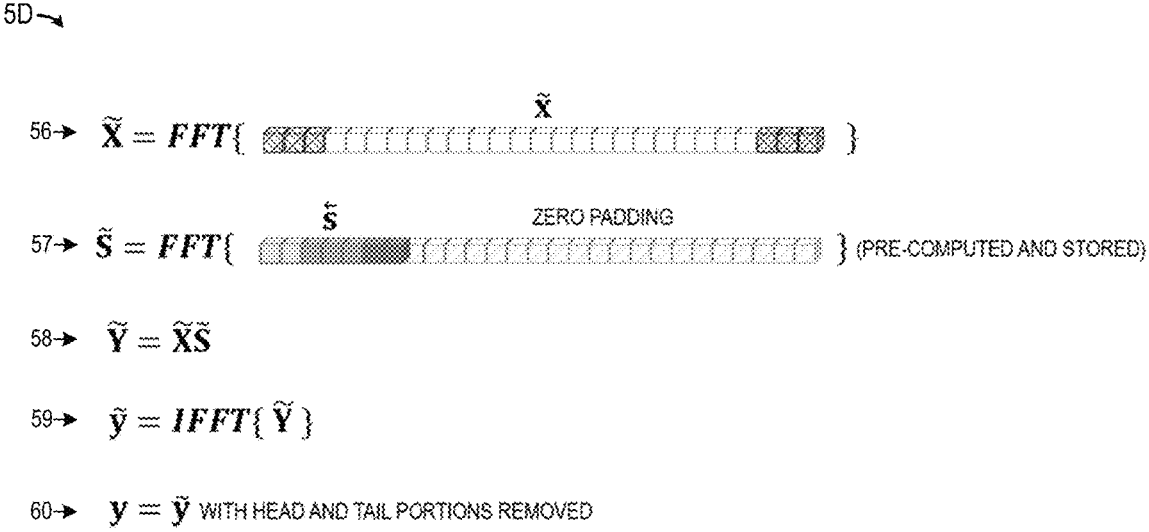
FIG. 5D is a simplified block diagram representation of the computational steps for converting the time-domain convolution into a spectral domain convolution using hardware elements for performing FFT, element-wise product, and IFFT operations.

Referring now to FIG. 5D, there is depicted a simplified block diagram 5D representing the computational steps 56-60 for converting the time-domain convolution into a spectral domain convolution using hardware elements for performing FFT, element-wise product, and IFFT operations. As shown with the computation step 56, a fast time Fourier transform (FFT) may be applied to the padded target response x̃ to compute a discrete target response spectrum X̃. In addition and as shown with the computation step 57, the complex conjugated order-reversed window weight vector ($\overset{\leftarrow}{s}$) is zero-padded to the same length of the head and tail padded target response x̃, and then a fast time Fourier transform (FFT) may be applied to the zero-padded complex conjugated order-reversed window weight vector ($\overset{\leftarrow}{s}$) to compute a discrete window spectrum S̃. Next and as shown with the computation step 58, the element-wise product of the spectrums is computed (i.e. Ỹ=X̃S̃). Next and as shown with the computation step 59, an inverse fast time Fourier transform (IFFT) may be applied to convert the spectrum product Ỹ back to the time domain to obtain the padded detection decision metric output vector (i.e. ỹ=IFFT{Ỹ}). Next and as shown with the computation step 60, the head and tail paddings are removed from padded detection decision metric output vector ỹ to obtain the final detection decision metric output vector y. Cells corresponding to negative-value elements of y are declared as detections.

As seen from the above, the final modified spectral-domain convolution process used to implement CA-CFAR detection includes two FFT operations (56, 57) and one element-wise product operation of length–N+W–1 (58), and then one IFFT operation of length N+W–1 (59) is used to convert the spectrum product V back to the time domain. Referring back to FIG. 1, the operation of the CFAR detector 13 may leverage the hardware accelerator engines 17B-D to implement the modified spectral-domain convolution process by calculating the convolution term y=CONV{x̃, $\overset{\leftarrow}{s}$} 17A. In particular, one or more FFT hardware unit(s) 17B may be used to compute the discrete target response spectrum X̃ and the discrete window spectrum S̃. In addition, one or more element-wise multiplier units 17D may be used to compute the spectrum product (Ỹ=X̃S̃). Finally, the IFFT hardware unit(s) 17C may be used to convert the spectrum product Ỹ back to the time domain by computing ỹ=IFFT{Ỹ}.

Figure 6:
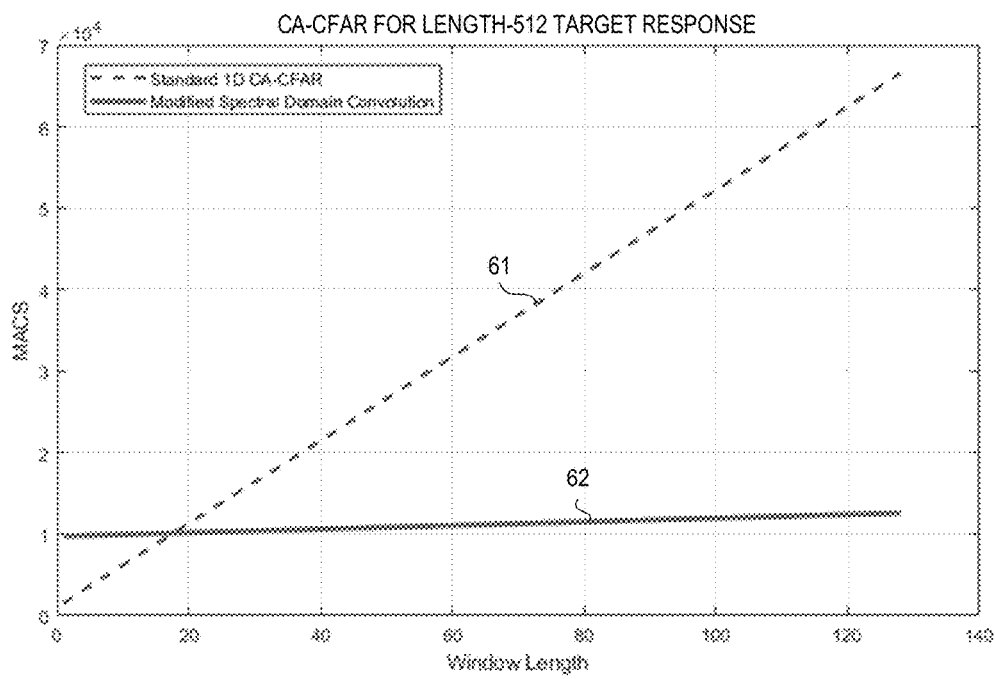
FIG. 6 is a diagrammatic comparison of the computation burden of performing conventional 1D CA-CFAR processing and a modified spectral domain convolution CA-CFAR processing in accordance with selected embodiments of the present disclosure.

In practice, the discrete window spectrum g may be computed once and stored so that there is no real-time computational processing required to apply an FFT to the padded order-reversed window weight vector ($\overset{\leftarrow}{s}$). As a result, the total computation burden for the final modified spectral-domain convolution process is N+W–1+2(N+W–1)log 2(N+W–1) MACS comparing to standard CA-CFAR's N(W+2). The relative computational burdens are illustrated in FIG. 6 which depicts a diagrammatic comparison 6 of the computation burden line 61 for performing conventional 1D CA-CFAR processing with the computation burden line 62 for performing a modified spectral domain convolution CA-CFAR processing in accordance with selected embodiments of the present disclosure. In the depicted simulation, a target response vector of 512 cells is simulated against varying windowing lengths up to 128 cells. As can be seen, the rate of complexity growth of the standard method 61 is much higher than the modified spectral domain convolution CA-CFAR processing 62, demonstrating the benefit and usefulness of the present disclosure. In practice, when hardware accelerated FFT engine is used, the savings in computational resources is further increased where the accelerated FFT can transform longer data in fewer cycles than non-accelerated FFT operations.

Figure 7:
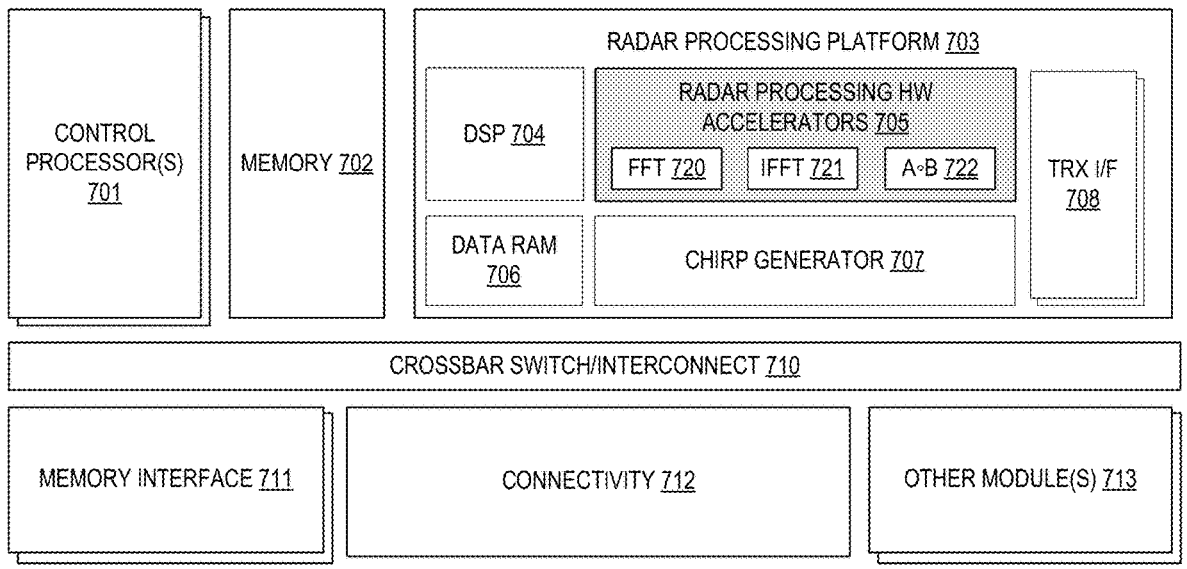
FIG. 7 is a simplified architectural block diagram of a microcontroller system for automotive and industrial high-performance radar applications in accordance with selected embodiments of the present disclosure.

To provide additional details for an improved understanding of selected embodiments of the present disclosure, reference is now made to FIG. 7 which illustrates a simplified architectural block diagram of a microcontroller 7 for automotive and industrial high-performance radar applications which may implement the disclosed system, apparatus, and methodology for detecting one or more targets with a cell average-constant false alarm rate detector which uses a sliding cell-averaging window that is converted to a convolution problem in which the target (range, Doppler, angle) response is convolved with a modified kernel window so that the sign of the output indicates the detection decision. An example implementation, the microcontroller may be implemented with the NXP S32R45 radar MPU which provides high performance imaging radar as a 32-bit automotive radar microprocessor unit (MPU) based on DSP, Arm® Cortex®, and FFT accelerator cores within a single chip.

As depicted, the microcontroller 7 includes one or more control processor or central processing unit (CPU) subsystems 701, on-chip memory 702 (e.g., volatile or non-volatile memory), and radar processing platform 703 for providing radar-specific high throughput signal processing. For example, the radar processing platform 703 may include one or more digital signal processor (DSP) cores 704, one or more radar processing hardware accelerators 705, a data RAM 706, a chirp generator 707, and a transceiver interface 708 to provide transmit and receive module control and processing. The processor(s) 701, on-chip memory 702, and radar processing platform 703 may be connected over an on-chip interconnect 710 to a memory interface 711, (e.g., DDR interface), one or more connectivity modules 712 (e.g., PCIe 2x, FlexPWM, eTimer, IIC, DSPI, etc.), and other modules 713. In selected embodiments, the microcontroller 7 may be implemented as circuitry on a single integrated circuit or system-on-chip (SoC). In addition, the interconnect 710 can be any type of bus structure, including but not limited to a non-coherent interconnect, an advanced high-performance bus (AHB), or an advanced peripheral bus (APB). In addition, the control processor(s) 701 may be any type of processing circuit, including but not limited to a microprocessor (MPU), microcontroller (MCU), digital signal processor (DSP), or another type of processor or processor core with multiple levels of cache memory. Though not shown, the microcontroller 7 may include peripheral devices or special-purpose processors, communication interfaces, timers, encoders/decoders, and one or more external memory interfaces, such as DDR interface or flash interface. In turn, the external memory interfaces may be connected to external memory, such as DDR memory or flash memory.

As disclosed, the microcontroller 7 may use the control processor(s) 701 to provide a signal processing toolbox (SPT) which receives digital output signals from the radar processing platform 703 which uses the modules 704-708 to process received radar return signals by applying signal conditioning (e.g., low noise amplification, low/high pass filtering, and analog-to-digital conversion) and signal analysis (e.g., gain, windowing, FFT, and filtering). The resulting digital output signals are then processed by the control processor(s) 701 for detection and tracking to detect one or more targets. In particular, the control processor(s) 701 may execute control code instructions for a CA-CFAR detector algorithm which processes range and/or doppler compressed RDM data using a modified spectral-domain convolution to implement a sliding cell-averaging window that can be arbitrarily shaped and weighted to adapt to various use cases.

In selected embodiments, the control code instructions for a CA-CFAR detector algorithm may be executed by the DSP core 704 to process the range and/or doppler compressed RDM data with a spectral domain convolution CA-CFAR computation y=CONV{$\tilde{x}$, $\tilde{s}$} using the processing hardware accelerators 720-722 to efficiently calculate a CA-CFAR threshold $T_{CA}$ from the target response data. In particular, the control code instructions for a CA-CFAR detector algorithm may be executed by the control processor(s) 701 and/or DSP core 704 to determine the total length of the padded target response $\tilde{x}$, and to then add zero padding to an order-reversed window weight vector ($\tilde{s}$) to have the same total length of the padded target response $\tilde{x}$. In addition, the CA-CFAR log detector control code instructions may be executed by the control processor(s) 701 and/or DSP core 704 to use the FFT unit(s) 720 to compute the discrete target response spectrum $\tilde{X}$ from the padded target response $\tilde{x}$ and to compute the discrete window spectrum $\tilde{S}$ from the zero-padded order-reversed window weight vector ($\tilde{s}$). Alternatively, the control processor(s) 701 and/or DSP core 704 may be configured to retrieve the previously-computed discrete window spectrum $\tilde{S}$ from memory (e.g., 706). The CA-CFAR log detector control code instructions may also be executed by the control processor(s) 701 and/or DSP core 704 to use the element-wise multiplier unit 722 to compute the spectrum product ($\tilde{Y}=\tilde{X}\tilde{S}$). In addition, the CA-CFAR log detector control code instructions may be executed by the control processor(s) 701 and/or DSP core 704 to use the IFFT unit(s) 721 to transform the spectrum product back to the time domain to obtain the padded detection decision metric output vector $\tilde{y}=\text{IFFT}\{\tilde{Y}\}$) and to remove the head and tail paddings to obtain the final detection decision metric output vector y. Finally, the CA-CFAR log detector control code instructions may be executed by the control processor(s) 701 and/or DSP core 704 to identify or declare target detections from any cells from the target response (x) corresponding to negative-value elements of y.

Figure 8A:
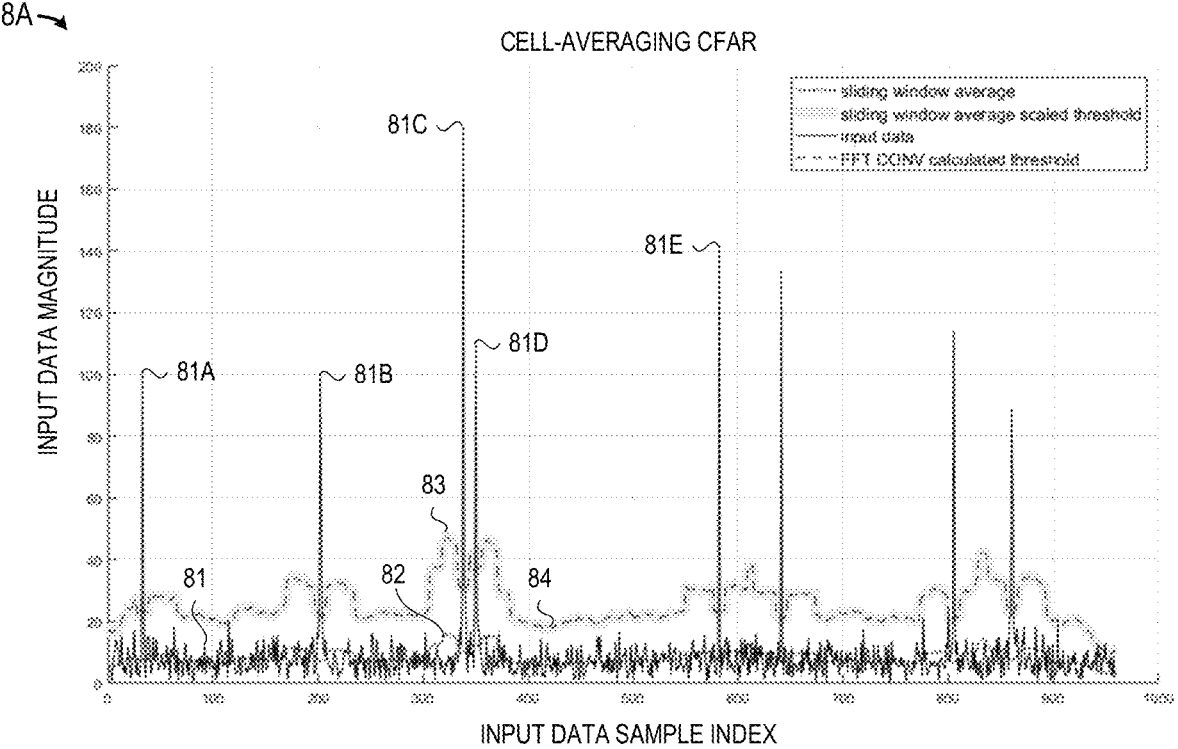
FIG. 8A depicts a simulated range profile for a conventionally calculated CA-CFAR threshold that is applied to a range-compressed input signal for detecting multiple targets.

Turning first to FIG. 8A, there is depicted a simulated range profile 8A for a conventionally calculated CA-CFAR threshold 83 that is applied to a range-compressed input signal 81 for detecting multiple targets (e.g., 81A-E). In the simulated range profile 8A, the range-compressed input signal 81 has a data length of 959, and the CA-CFAR window length is 65 with 5 guard cells on each side of CUT. Using the conventional CA-CFAR approach, the sliding CA-CFAR window is applied to slide across the entire length of the input signal 81 to calculate the sliding window average 82, and then a scaling factor is applied to calculate the CA-CFAR threshold 83 that is applied or compared to the range-compressed input signal 81 for detecting target peaks 81A-E that exceed the CA-CFAR threshold 83. The simulated range profile 8A also shows the CA-CFAR threshold 84 that is calculated using the spectral domain convolution CA-CFAR approach and that coincides with the conventionally calculated CA-CFAR threshold 83. Generally speaking, the conventionally calculated CA-CFAR threshold 83 is the product of (1) a pre-computed scaling factor that depends on the desired probability of false alarm PFA and the assumed noise distribution, and (2) a measured/estimated higher statistic of the signal, such as noise variance $\sigma^2$. To detect targets 81A-E from the input signal 81, the CFAR algorithm sequentially compares each sample, or cell under test (CUT), to the CA-CFAR threshold 83. If the amplitude of the CUT is larger than the CA-CFAR threshold 83, than it is classified as a detection.

Figure 8B:
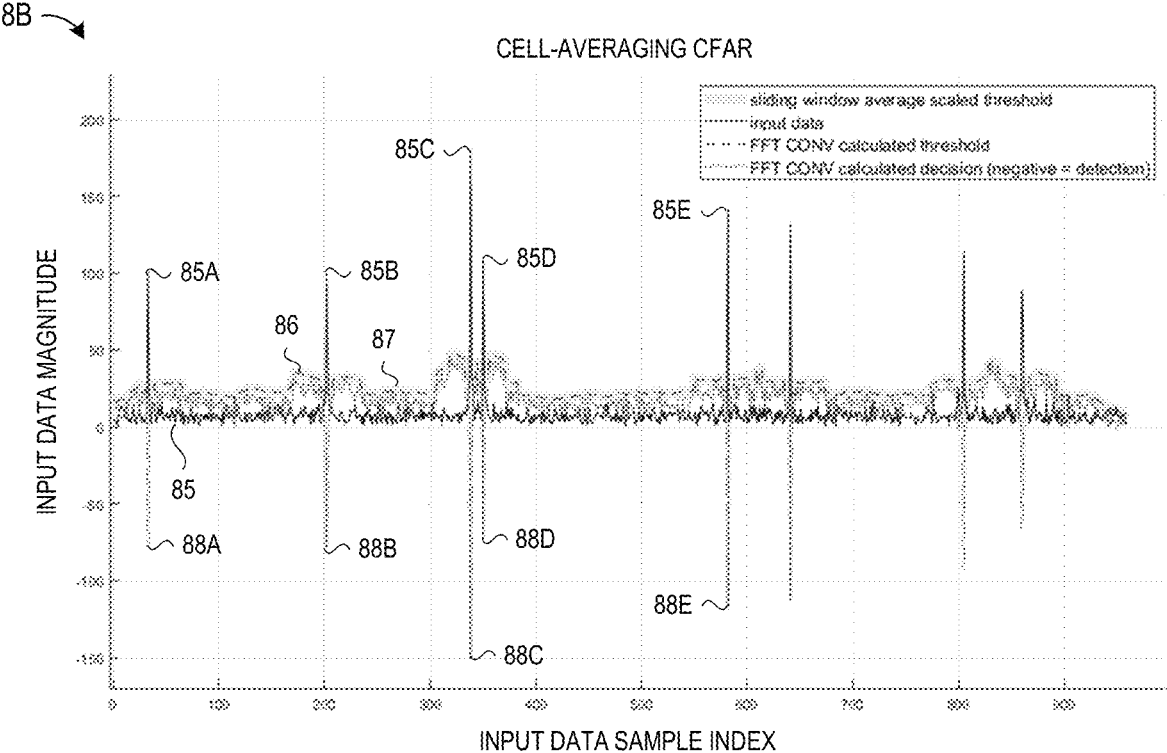
FIG. 8B depicts a simulated range profile for a CA-CFAR detection scheme that uses a modified spectral-domain convolution process to apply a sliding CA-CFAR window to a range-compressed input signal for detecting multiple targets.

Turning now to FIG. 8B, there is depicted a simulated range profile 8B for a CA-CFAR detection scheme that uses a modified spectral-domain convolution process to apply a sliding CA-CFAR window to a range-compressed input signal 85 for detecting multiple targets 85A-E. In the simulated range profile 8B, the range-compressed input signal 85 has a data length of 959, and the CA-CFAR window length is 65 with 5 guard cells on each side of CUT. Using the modified spectral-domain convolution CA-CFAR approach, the CA-CFAR threshold 86 is calculated using the spectral domain convolution CA-CFAR approach and applied across the entire length of the input signal 85. In addition, the FFT convolution calculated decision line 88 is plotted to identify target detections 88A-E. While illustrated for simplicity with the example of a 1D detection, it will be appreciated that the spectral domain convolution CA-CFAR approach can be easily extended into 2D and 3D embodiments using 2D and 3D FFTs. For simplicity the derivations will not be provided herein.

Figure 9:
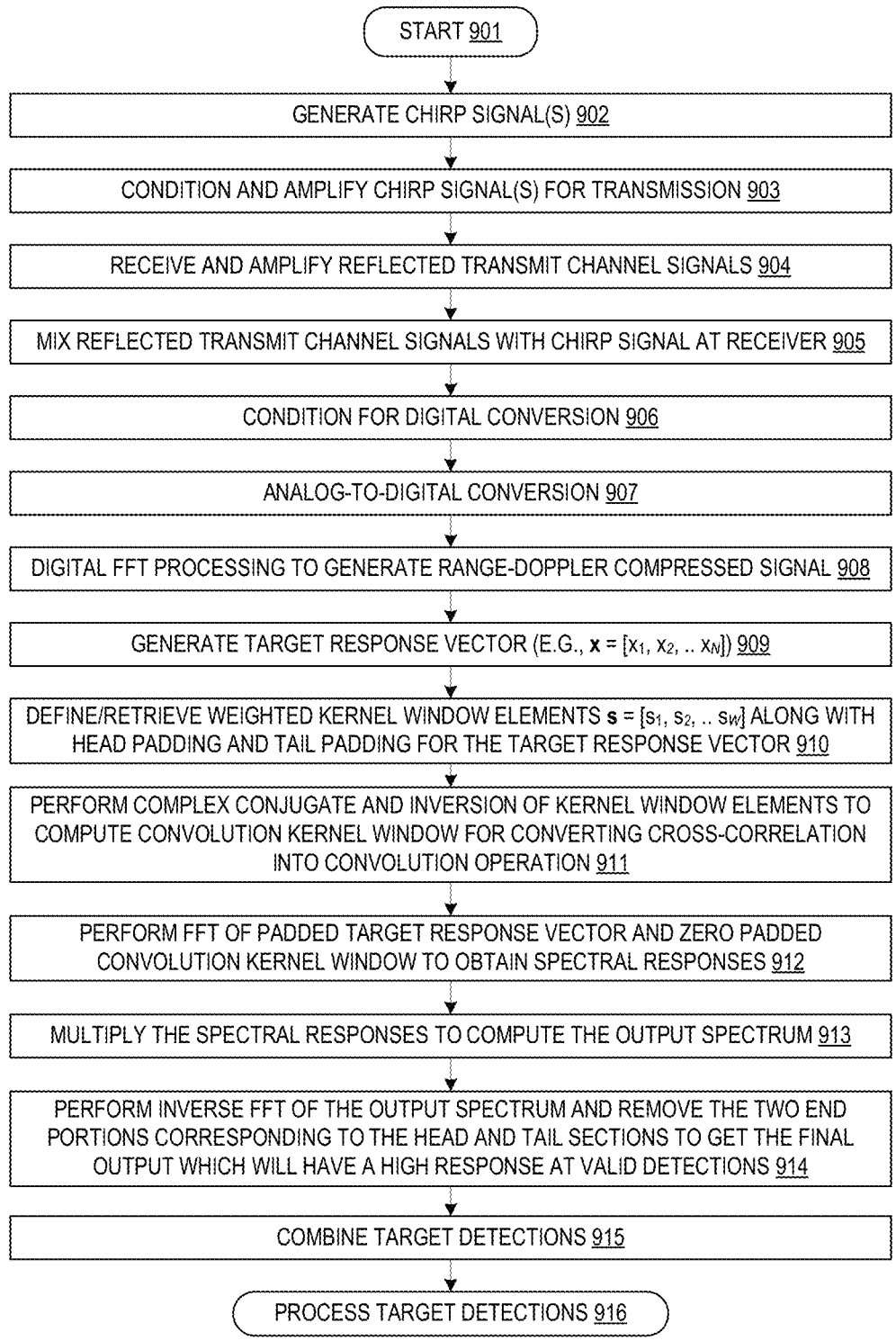
FIG. 9 illustrates a simplified flow chart showing the logic for implementing spectral domain convolution CA-CFAR target detection in accordance with selected embodiments of the present disclosure.

To provide additional details for an improved understanding of selected embodiments of the present disclosure, reference is now made to FIG. 9 which illustrates a simplified flow chart 900 showing the logic for implementing CA-CFAR target detection using a modified spectral domain convolution operation to implement a sliding window function. In an example embodiment, the control logic and methodology shown in FIG. 9 may be implemented with a combination of hardware and software on a radar controller processor which uses an FFT and IFFT accelerator hardware to process a target response signal (e.g., range, Doppler, and/or angle) with a CA-CFAR sliding window with a window weight vector (s) to detect targets. Operating under the control of programming control code, the radar controller processor is configured to execute the cell average-constant false alarm rate detector algorithm by implementing a CA-CFAR sliding-window using a modified spectral-domain convolution computation that can be executed with hardware-accelerated Fast Fourier Transform and Inverse Fast Fourier Transform engines to achieve improved computational efficiency.

The process starts (step 901), such as when the radar system begins the process of sensing the location and movement of one or more target objects using one or more transmit radar signals that are sent over a plurality of transmit antennas. To generate the transmit radar signals, the radar system first generates a reference chirp signal (step 902), such as by periodically modulating a transmit radar signal with a frequency and/or phase shift. For example, with automotive Frequency Modulation Continuous Wave (FMCW) radars, the reference chirp signal may be generated as a Linear Frequency Modulation (LFM) waveform that is distributed to a plurality of transmit channel circuits which are respectively associated with a plurality of transmit antennas.

At step 903, the chirp signals are conditioned and amplified for transmission over the corresponding transmit channel circuits. In selected embodiments, this processing is performed by the transmit channel circuits which each include an RF conditioning module (which filters the chirp signal) and power amplifier (which amplifies the RF conditioning module output for transmission over a corresponding transmit antenna). In embodiments where time-domain modulation is used in combination with the frequency/phase offset modulation, the non-adjacent transmit channel circuits may be controlled to sequentially condition and amplify transmit radar waveforms from non-adjacent transmit antennas.

At step 904, each receiver channel may receive and amplify the reflected reference chirp signals from the different transmit channels. In selected embodiments, one or more receive antennas at the receiver module receive target returns from the transmitted reference chirp signal waveforms as (radio frequency) antenna signals for subsequent amplification, such as by using a low noise amplifier to generate an amplified RF signal from the target returns.

At step 905, each receiver channel may mix the amplified transmit channel signals with the reference chirp signal at the receiver to generate an intermediate frequency (IF) signal. In selected embodiments, the mixing step may be implemented by applying the reference chirp signal to a receiver module mixer which is also connected to receive the amplified transmit channel signals for mixing with the reference chirp signal, thereby generating an intermediate frequency signal.

At step 906, each receiver channel may condition the intermediate frequency signal for digital conversion. In selected embodiments, the conditioning process includes at least feeding the intermediate frequency signal to a bandpass-pass filter, alone or in combination with additional programmable gain and/or filtering steps, thereby generating a bandpass-filtered signal.

At step 907, each receiver channel may digitize the bandpass-filtered conditioned IF signal, such as by using a high-speed analog/digital converter (ADC) to generate a digital signal output that is suitable for digital processing. Because the maximum unambiguous range extent for each frequency offset reference chirp signal is inversely related to the fast-time sampling interval, the ADC has a high sampling rate.

At step 908, the radar controller performs digital FFT processing on the digital signal to generate a range compressed signal where the reflected transmit channel signals are separated in the fast-time FFT or range domain. In addition, additional digital processing is applied to generate a range-Doppler compressed signal where the reflected transmit channel signals are separated in the slow-time FFT or Doppler domain. While any suitable radar signal processing steps may be used, each radar may be configured to perform fast-time FFT and slow-time FFT processing on the received radar signal to derive range and Doppler information.

At step 909, the radar controller generates a target response magnitude vector $x=[x_1, x_2, \ldots x_N]$ of 1D target responses (e.g., range, Doppler, or angle). As will be appreciated, the target responses generated at step 909 may be generated as 1D, 2D, or 3D vectors or arrays.

At step 910, the radar controller defines or retrieves a weighted kernel window vector $s=[s_1, s_2, \ldots s_W]$ and adds head padding and tail padding to the target response magnitude vector x. In selected embodiments, the weighted kernel window elements for the averaging cells may be constructed to use the scaling factor $s=K_{TH}/(2L_A)$, where $L_A$ is the number of averaging cells and where $K_{TH}$ is the detection margin factor which sets the threshold higher than the averaged output. In addition, the weighted kernel window elements for the guard cells may be constructed with the weights set to 0, and the weighted kernel window elements for the CUT may be constructed with the weight set the −1. As will be appreciated, the weighted kernel window vector generated at step 910 may be generated as 1D, 2D, or 3D vectors or arrays.

At step 911, the radar controller performs a complex conjugate operation on the elements of the weighted kernel window vector s, and then inverts the order of the complex conjugated kernel window elements to compute a convolution kernel window ($\tilde{s}$) for use in converting a cross-correlation function into a convolution window. As will be appreciated, the weighted kernel window vector generated at step 910 may be generated as 1D, 2D, or 3D vectors or arrays.

At step 912, the radar controller performs an FFT operation of the target response magnitude vector x after adding head and tail padding to compute a discrete target response spectrum $\tilde{X}$. In addition, the radar controller performs an FFT operation of the convolution kernel window ($\tilde{s}$) after adding zero padding to match the length of the padded target response vector to compute a discrete window spectrum $\tilde{S}$. In selected embodiments, the FFT computations may be performed using a hardware accelerated FFT engine. As will be appreciated, the FFT operation to compute the discrete window spectrum $\tilde{S}$ may be replaced by instead retrieving the discrete window spectrum $\tilde{S}$ from memory.

At step 913, the radar controller multiplies the spectral responses $\tilde{X}$ and $\tilde{S}$ to obtain the output spectrum value $\tilde{Y}$. In selected embodiments, the output spectrum computation may be performed using an element-wise multiplier to compute the output spectrum product ($\tilde{Y}=\tilde{X}\tilde{S}$).

At step 914, the radar controller performs an IFFT operation of the output spectrum value and then removes the head and tail end portions to compute the final output which provides a high response to valid target detections. In selected embodiments, the IFFT computation may be performed using a hardware accelerated IFFT engine.

The processing at steps 912-914 is repeated until all detector sample values in the target response magnitude vector x have been evaluated as a cell under test, such as by detecting if the last cell under test has been reached. When the last cell under test is processed, then the processing proceeds to step 915 where the target detections identified by the CFAR algorithm processing steps 909-914 are combined to obtain the range-Doppler peak detections. At step 916, the combined target detections are processed to estimate the direction of arrival before continuing with target tracking processing and measurement processing, with the result being output to other automotive computing or user interfacing devices for further process or display.

As disclosed herein, a vehicle radar system, apparatus and method use a radar control processing unit to apply target detection processing to compressed radar data signals by convolving a target range, Doppler, and/or angle response with a modified kernel window in the time domain, and then using FFT and IFFT accelerator hardware engines and an element-wise multiplier hardware unit to implement a cell-averaging constant false alarm rate (CA-CFAR) detector. In various embodiments, the compressed radar data signals may be generated as one, two, or three-dimensional target responses, and the modified kernel windows may also be generated as one, two, or three-dimensional kernel windows. In addition, the convolution of the target response and modified kernel window in the time domain may be computed as the time-domain convolution term $y=\text{CONV}\{\tilde{x}, \overset{\leftarrow}{\tilde{s}}\}$, and may be solved in the spectral domain by zero-padding the complex conjugated order-reversed window weight vector $\overset{\leftarrow}{\tilde{s}}$ to the same length of the padded target response $\tilde{x}$, and then computing the discrete spectrums, $\tilde{X}=\text{FFT}\{\tilde{x}\}$ and $\tilde{S}=\text{FFT}\{\overset{\leftarrow}{\tilde{s}}$ with zero padding$\}$ before computing the element-wise multiplication product of the spectrums $\tilde{Y}=\tilde{X}\tilde{S}$ and then applying an inverse fast Fourier transform to convert the spectral product back to the time domain to obtain the padded detection decision metric output vector $\tilde{y}=\text{IFFT}\{\tilde{Y}\}$ which contains the final detection decision metric output vector y which is padded with head and tail paddings.

By now it should be appreciated that there has been provided a radar system, device, and method for performing constant false alarm rate (CFAR) target detection with a radar control processing unit. The disclosed radar system includes a radio-frequency (RF) transmitter unit and first plurality of transmit antennas which are connected and controlled by the radar control processing unit to transmit MIMO radar signals. The disclosed radar system also includes an RF receiver unit and a first plurality of receive antennas which are connected and controlled by the radar control processing unit to generate digital output signals from MIMO radar signal returns received in response to the MIMO radar signals. The disclosed radar control processing unit is configured to generate, from the digital output signals, a target response signal in at least a first dimension. In addition, the disclosed radar control processing unit is configured to perform cell-averaging constant false alarm rate (CFAR) target detection by convolving the target response signal with a weighted kernel window signal to generate an output signal having a sign that indicates a target detection decision. In selected embodiments, the radar control processing unit is configured to convolve the target response signal with the weighted kernel window signal in a frequency domain using a Fast Fourier Transform hardware accelerator and an inverse Fast Fourier Transform hardware accelerator. In selected embodiments, the target response signal and the weighted kernel window signal are each a one-dimensional signal, a two-dimensional signal, or a three-dimensional signal. In addition, the radar control processing unit may be configured to perform a one-dimensional convolution, a two-dimensional convolution, or a three-dimensional convolution of the target response signal with the weighted kernel window signal. In selected embodiments, the radar control processing unit is configured to construct the target response signal as a target response magnitude vector $x=[x_1, x_2, \ldots x_N]$ of 1D target responses. In such embodiments, the radar control processing unit may also be configured to convolve the target response signal with the weighted kernel window signal by adding head and tail padding to the target response magnitude vector x to generate a padded target response magnitude vector. In selected embodiments, the convolution processing may also include computing or retrieving a weighted kernel window vector s comprising W weighting elements $[s_1, s_2, \ldots s_W]$, where W<N. In selected embodiments, the W weighting elements $[s_1, s_2, \ldots s_W]$ may include a CUT element having a weight of −1, a plurality of guard elements having a weight of 0 and disposed on each side of the CUT element, and a plurality of averaging elements having a predetermined scaling weight and disposed on each side of the plurality of guard elements. In other embodiments, the weighting elements are assigned based on heuristic optimization results or learned results based on a data-driven training process. For example, the zero and one weights can be replaced with continuous values to achieve a smoother averaging result. In another example, the weighting elements are trained from a data set with labeled detected targets and the weights are obtained via typical learning processes, such as the back propagation. The weighting W weighting elements $[s_1, s_2, \ldots s_W]$ may be constructed with a plurality of weighted averaging elements based on a data training process. In addition, the convolution processing may include computing a convolution kernel window vector ($\overset{\leftarrow}{s}$) by reversing an index order of elements in the weighted kernel window vector s to generate an order-reversed window weight vector and computing complex conjugate values for the order-reversed window weight vector. The convolution processing may also include adding zero padding to the convolution kernel window vector ($\overset{\leftarrow}{\tilde{s}}$) to generate a padded convolutional kernel window vector having a length to match the padded target response magnitude vector. In addition, the convolution processing may include computing a discrete target response spectrum $\tilde{X}$ by performing a fast Fourier transform of the padded target response magnitude vector. The convolution processing may also include computing a discrete window spectrum $\tilde{S}$ by performing a fast Fourier transform of the padded convolutional kernel window vector. In addition, the convolution processing may include computing an element-wise multiplication product of the discrete target response spectrum $\tilde{X}$ and the discrete window spectrum $\tilde{S}$ to generate a spectral product $\tilde{Y}=\tilde{X}\tilde{S}$. Finally, the convolution processing may include applying an inverse fast Fourier transform to convert the spectral product back to generate a padded detection decision metric output vector $\tilde{y}=\text{IFFT}\{\tilde{Y}\}$ which contains a final detection decision metric output vector y which is padded with head and tail paddings. In such embodiments, the radar control processing unit may be configured to generate the output signal by declaring a target detection for each negative-value element of the final detection decision metric output vector y.

In another form, there is provided a method for operating a radar system and device. In the disclosed methodology, MIMO radar signals are transmitted from transit antennas in a plurality of transmit and receive antennas. The disclosed methodology also includes receiving MIMO radar return signals at receive antennas in the plurality of transmit and receive antennas, and generating, at a plurality of receive channels, digital output signals from the MIMO radar return signals. In addition, the disclosed methodology includes processing the digital output signals to perform cell-averaging constant false alarm rate (CFAR) target detection by generating, from the digital output signals, a target response signal in at least a first dimension and by convolving the target response signal with a weighted kernel window signal to generate an output signal having a sign that indicates a target detection decision. In selected embodiments, the digital output signals are processed by convolving the target response signal with the weighted kernel window signal in a frequency domain using a Fast Fourier Transform hardware accelerator and an inverse Fast Fourier Transform hardware accelerator. In other embodiments, the target response signal is convolved with the weighted kernel window signal by computing a discrete target response spectrum by applying a fast Fourier transform to at least the target response signal; retrieving a discrete window spectrum by that is computed by applying a fast Fourier transform to a zero-padded convolutional kernel window signal generated from the weighted kernel window signal; performing an element-wise product of the discrete target response spectrum and the discrete window spectrum to compute a spectral product; and applying an inverse fast Fourier transform to the spectral product to generate a padded detection decision metric output signal which contains a final detection decision signal. In such embodiments, the target response signal may be a target response magnitude vector $x=[x_1, x_2, \ldots x_N]$ of 1D target responses, and the discrete target response spectrum may be computed by applying a fast Fourier transform to a padded target response signal comprising a head padding, the target response signal, and a tail padding. In addition, the weighted kernel window signal may include W<N weighting elements $[s_1, s_2, \ldots s_W]$, and the zero-padded convolutional kernel window signal is generated from the weighted kernel window signal by computing a convolution kernel window vector ($\breve{s}$) by reversing an index order of elements in the weighted kernel window vector s to generate an order-reversed window weight vector and computing complex conjugate values for the order-reversed window weight vector, and adding zero padding to the convolution kernel window vector ($\breve{s}$) to generate the zero-padded convolutional kernel window signal having a length to match the padded target response signal. In such embodiments, the W<N weighting elements $[s_1, s_2, \ldots s_W]$ may include a CUT element having a weight of −1, a plurality of guard elements having a weight of 0 and disposed on each side of the CUT element, and a plurality of averaging elements having a predetermined scaling weight and disposed on each side of the plurality of guard elements. In selected embodiments, the target response signal and the weighted kernel window signal are each a one-dimensional target response signal, a two-dimensional target response signal, or a three-dimensional target response signal. In other embodiments, the target response signal is convolved with the weighted kernel window signal by performing a one-dimensional convolution, a two-dimensional convolution, or a three-dimensional convolution of the target response signal with the weighted kernel window signal.

In yet another form, there is provided a radar apparatus and associated method of operation. In the disclosed radar apparatus, a transmitter is configured to transmit a first transmit signal and a second transmit signal. The radar apparatus also includes a receiver configured to produce digital output signals from first and second transmit signal returns received in response to the first and second transmit signals. In addition, the radar apparatus includes a digital signal processor configured to generate, from the digital output signals, a target response signal in at least a first dimension. In selected embodiments, the target response signal and the weighted kernel window signal are each a one-dimensional signal, a two-dimensional signal, or a three-dimensional signal. The digital signal processor is also configured to perform cell-averaging constant false alarm rate (CFAR) target detection by convolving the target response signal with a weighted kernel window signal to generate an output signal having a sign that indicates a target detection decision, thereby identifying one or more targets in the first and second transmit signal returns. In selected embodiments, the digital signal processor is configured to perform a one-dimensional convolution, a two-dimensional convolution, or a three-dimensional convolution of the target response signal with the weighted kernel window signal. In other selected embodiments, the digital signal processor is configured to convolve the target response signal with the weighted kernel window signal in a frequency domain using a Fast Fourier Transform hardware accelerator and an Inverse Fast Fourier Transform hardware accelerator.

Although the described exemplary embodiments disclosed herein focus on example automotive radar circuits, systems, and methods for using same, the present invention is not necessarily limited to the example embodiments illustrate herein. For example, various embodiments of a distributed aperture radar may be applied in non-automotive applications, and may use additional or fewer circuit components than those specifically set forth. Thus, the particular embodiments disclosed above are illustrative only and should not be taken as limitations upon the present invention, as the invention may be modified and practiced in different but equivalent manners apparent to those skilled in the art having the benefit of the teachings herein. Accordingly, the foregoing description is not intended to limit the invention to the particular form set forth, but on the contrary, is intended to cover such alternatives, modifications and equivalents as may be included within the spirit and scope of the invention as defined by the appended claims so that those skilled in the art should understand that they can make various changes, substitutions and alterations without departing from the spirit and scope of the invention in its broadest form.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as a critical, required, or essential feature or element of any or all the claims. As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A radar system, comprising:
a radio-frequency (RF) transmitter unit and first plurality of transmit antennas which are connected to transmit MIMO radar signals;
an RF receiver unit and a first plurality of receive antennas which are connected to generate digital output signals from MIMO radar signal returns received in response to the MIMO radar signals; and
a radar control processing unit connected and configured to control the RF transmitter unit and the RF receiver unit;
wherein the radar control processing unit is configured to generate, from the digital output signals, a target response signal in at least a first dimension; and
wherein the radar control processing unit is further configured to perform cell-averaging constant false alarm rate (CFAR) target detection by convolving the target response signal with a weighted kernel window signal to generate an output signal having a sign that indicates a target detection decision.

2. The radar system of claim 1, wherein the target response signal and the weighted kernel window signal are each a one-dimensional signal, a two-dimensional signal, or a three-dimensional signal.

3. The radar system of claim 1, wherein the radar control processing unit is configured to perform a one-dimensional convolution, a two-dimensional convolution, or a three-dimensional convolution of the target response signal with the weighted kernel window signal.

4. The radar system of claim 1, wherein the radar control processing unit is configured to convolve the target response signal with the weighted kernel window signal in a frequency domain using a Fast Fourier Transform hardware accelerator and an Inverse Fast Fourier Transform hardware accelerator.

5. The radar system of claim 1, wherein the radar control processing unit is configured to construct the target response signal as a target response magnitude vector $x=[x_1, x_2, \ldots x_N]$ of 1D target responses.

6. The radar system of claim 5, wherein the radar control processing unit is configured to convolve the target response signal with the weighted kernel window signal by:
adding head and tail padding to the target response magnitude vector x to generate a padded target response magnitude vector;
computing or retrieving a weighted kernel window vector s comprising W weighting elements $[s_1, s_2, \ldots s_W]$, where $W<N$;
computing a convolution kernel window vector ($\overset{\leftarrow}{s}$) by reversing an index order of elements in the weighted kernel window vector s to generate an order-reversed window weight vector and computing complex conjugate values for the order-reversed window weight vector;
adding zero padding to the convolution kernel window vector ($\overset{\leftarrow}{s}$) to generate a padded convolutional kernel window vector having a length to match the padded target response magnitude vector;
computing a discrete target response spectrum $\tilde{X}$ by performing a fast Fourier transform of the padded target response magnitude vector;
computing a discrete window spectrum $\tilde{S}$ by performing a fast Fourier transform of the padded convolutional kernel window vector;
computing an element-wise multiplication product of the discrete target response spectrum $\tilde{X}$ and the discrete window spectrum $\tilde{S}$ to generate a spectral product $\tilde{Y}=\tilde{X}\tilde{S}$; and
applying an inverse fast Fourier transform to convert the spectral product back to generate a padded detection decision metric output vector $\tilde{y}=\text{IFFT}\{\tilde{Y}\}$ which contains a final detection decision metric output vector y which is padded with head and tail paddings.

7. The radar system of claim 6, wherein the W weighting elements $[s_1, s_2, \ldots s_W]$ comprises:
a CUT element having a weight of $-1$;
a plurality of guard elements having a weight of 0 and disposed on each side of the CUT element; and
a plurality of averaging elements having a predetermined scaling weight and disposed on each side of the plurality of guard elements.

8. The radar system of claim 6, wherein the W weighting elements $[s_1, s_2, \ldots s_W]$ comprise a plurality of weighted averaging elements based on a data training process.

9. The radar system of claim 6, wherein the radar control processing unit is configured to generate the output signal by declaring a target detection for each negative-value element of the final detection decision metric output vector y.

10. A method for operating a radar system, comprising:
transmitting MIMO radar signals from transit antennas in a plurality of transmit and receive antennas;
receiving MIMO radar return signals at receive antennas in the plurality of transmit and receive antennas;
generating, at a plurality of receive channels, digital output signals from the MIMO radar return signals; and
processing the digital output signals to perform cell-averaging constant false alarm rate (CFAR) target detection by generating, from the digital output signals, a target response signal in at least a first dimension and by convolving the target response signal with a weighted kernel window signal to generate an output signal having a sign that indicates a target detection decision.

11. The system of claim 10, wherein the target response signal and the weighted kernel window signal are each a one-dimensional target response signal, a two-dimensional target response signal, or a three-dimensional target response signal.

12. The system of claim 10, wherein convolving the target response signal with the weighted kernel window signal comprises performing a one-dimensional convolution, a two-dimensional convolution, or a three-dimensional convolution of the target response signal with the weighted kernel window signal.

13. The system of claim 10, wherein processing the digital output signals comprises convolving the target response signal with the weighted kernel window signal in a frequency domain using a Fast Fourier Transform hardware accelerator and an Inverse Fast Fourier Transform hardware accelerator.

14. The method system of claim 10, wherein convolving the target response signal with the weighted kernel window signal comprises:
computing a discrete target response spectrum by applying a fast Fourier transform to at least the target response signal;
retrieving a discrete window spectrum by that is computed by applying a fast Fourier transform to a zero-padded convolutional kernel window signal generated from the weighted kernel window signal;

performing an element-wise product of the discrete target response spectrum and the discrete window spectrum to compute a spectral product; and applying an inverse fast Fourier transform to the spectral product to generate a padded detection decision metric output signal which contains a final detection decision signal.

15. The method of claim 14, where the target response signal comprises a target response magnitude vector $x=[x_1, x_2, \ldots x_N]$ of 1D target responses, and where computing the discrete target response spectrum comprises applying a fast Fourier transform to a padded target response signal comprising a head padding, the target response signal, and a tail padding.

16. The method of claim 15, where the weighted kernel window signal comprises W<N weighting elements $[s_1, s_2, \ldots s_W]$; and where the zero-padded convolutional kernel window signal is generated from the weighted kernel window signal by:

computing a convolution kernel window vector ($\overleftarrow{s}$) by reversing an index order of elements in the weighted kernel window vector s to generate an order-reversed window weight vector and computing complex conjugate values for the order-reversed window weight vector, and adding zero padding to the convolution kernel window vector ($\overleftarrow{s}$) to generate the zero-padded convolutional kernel window signal having a length to match the padded target response signal.

17. The method claim 16, wherein the W<N weighting elements $[s_1, s_2, \ldots s_W]$ comprises:

a CUT element having a weight of −1;

a plurality of guard elements having a weight of 0 and disposed on each side of the CUT element; and a plurality of averaging elements having a predetermined scaling weight and disposed on each side of the plurality of guard elements.

18. A radar apparatus, comprising:

a transmitter configured to transmit a first transmit signal and a second transmit signal;

a receiver configured to produce digital output signals from first and second transmit signal returns received in response to the first and second transmit signals; and a digital signal processor configured to:

generate, from the digital output signals, a target response signal in at least a first dimension; and perform cell-averaging constant false alarm rate (CFAR) target detection by convolving the target response signal with a weighted kernel window signal to generate an output signal having a sign that indicates a target detection decision, thereby identifying one or more targets in the first and second transmit signal returns.

19. The radar apparatus of claim 18, wherein the target response signal and the weighted kernel window signal are each a one-dimensional signal, a two-dimensional signal, or a three-dimensional signal.

20. The radar apparatus of claim 18, wherein the digital signal processor is configured to perform a one-dimensional convolution, a two-dimensional convolution, or a three-dimensional convolution of the target response signal with the weighted kernel window signal.

21. The radar apparatus of claim 18, wherein the digital signal processor is configured to convolve the target response signal with the weighted kernel window signal in a frequency domain using a Fast Fourier Transform hardware accelerator and an Inverse Fast Fourier Transform hardware accelerator.

* * * * *